（12） United States Patent
Sack et al.

(10) Patent No.: US 7,307,642 B2
(45) Date of Patent: Dec. 11, 2007

(54) GRAPHICS COMPRESSION

(75) Inventors: Adrian Sack, London (GB); Srikanth Bandi, London (GB)

(73) Assignee: Ideaworks 3D Ltd. (GB)

( * ) Notice: Subject to any disclaimer, the term of this patent is extended or adjusted under 35 U.S.C. 154(b) by 770 days.

(21) Appl. No.: 10/179,774

(22) Filed: Jun. 24, 2002

(65) Prior Publication Data

US 2003/0001868 A1    Jan. 2, 2003

(30) Foreign Application Priority Data

Jun. 28, 2001  (GB)  ................... 0115838.5
Aug. 8, 2001   (GB)  ................... 0119351.5

(51) Int. Cl.
*G09G 5/00*  (2006.01)

(52) U.S. Cl. ................ 345/660; 345/619; 345/668

(58) Field of Classification Search ............. 345/619, 345/790, 613, 660–669, 475, 473; 382/299, 382/232–253; 708/653

See application file for complete search history.

(56) References Cited

U.S. PATENT DOCUMENTS

| | | | | |
|---|---|---|---|---|
| 5,384,904 A * | 1/1995 | Sprague et al. | ............. | 345/668 |
| 5,410,615 A * | 4/1995 | Mailloux | ................... | 382/299 |
| 6,041,143 A * | 3/2000 | Chui et al. | .................. | 382/232 |
| 6,081,824 A * | 6/2000 | Julier et al. | ................. | 708/653 |
| 7,006,711 B2 * | 2/2006 | Dresevic et al. | ............ | 382/299 |
| 2001/0017941 A1 * | 8/2001 | Chaddha | ..................... | 382/236 |
| 2001/0050685 A1 * | 12/2001 | Simons | ....................... | 345/475 |
| 2002/0018072 A1 * | 2/2002 | Chui | .......................... | 345/667 |
| 2002/0109729 A1 * | 8/2002 | Dutta | ......................... | 345/790 |
| 2003/0095135 A1 * | 5/2003 | Kaasila et al. | ............. | 345/613 |
| 2003/0137522 A1 * | 7/2003 | Kaasila et al. | ............. | 345/619 |
| 2003/0231190 A1 * | 12/2003 | Jawerth et al. | ............ | 345/660 |
| 2004/0004619 A1 * | 1/2004 | Capin et al. | ................ | 345/473 |

OTHER PUBLICATIONS

English Language Abstract of HITACHI JP 08-0055244, 2 pp, Feb. 27, 1996.
Sall, K., Not Just Another Pretty Graphics Standard, Sep. 1999, 3pp wdvl.internat.com/Authoring/Languages/XML/SVG/DoingIt/backround.html.
UK Patent Office, Search Report, related UK application No. GB0119351.5, Dec. 11, 2002, 2pp.

* cited by examiner

*Primary Examiner*—Kee M. Tung
*Assistant Examiner*—Chante Harrison
(74) *Attorney, Agent, or Firm*—Hancock Hughey LLP

(57) ABSTRACT

A method of manipulating a vector graphics data file representative of at least one graphics element defined by a set of co-ordinate values in a graphics image, the method comprising the step of scaling down the at least one graphics element by applying a scaling factor to the set of co-ordinate values defining the at least one graphics element. There is also disclosed a method of previewing a vector graphics image composed of a plurality of graphics elements comprising the steps of: parsing a vector graphics data file into individual graphics elements; selecting at least one graphics element; selecting and applying a scaling factor to a set of co-ordinate values defining the at least one selected graphics element; applying an inverse of the scaling factor to the set of co-ordinate values defining the at least one selected graphics element; displaying the graphics image including the graphics element having the scaling factor and inverse scaling factor applied thereto; and providing an indication of data file compression as a result of said scaling such that the effect of the scaling on image quality and data file size can be appreciated.

47 Claims, 3 Drawing Sheets

VECTOR GRAPHICS IMAGES SCALED AND PLACED ONTO MAIN MOVIE STAGE

GRAPHICS COMPRESSION

BACKGROUND AND SUMMARY OF THE INVENTION

The present invention relates to methods, systems and software for compressing graphics files and is directed in particular to the compression of vector graphics.

Graphic images are used on the vast majority of internet and internet websites. When a web page is accessed, these images must be downloaded and displayed within a user's browser. The size of the data file defining an image greatly influences the time taken to download the file and hence the delay a user experiences when viewing these images on a site. It is desirable, therefore, to minimise the size of the image data files that must be downloaded.

Unlike bitmap graphics, where the image is defined as an array of pixels, vector graphics represent images in terms of geometric formulae, each image essentially being made up from a series of curves and straight lines each having a start point and at least a direction. This basic information is supplemented by a variety of line styles and fill styles to define a complete image.

In many cases, vector graphics require less data than bitmap graphics and hence the resultant file size for representing the same image is smaller. For this reason, vector graphics are commonly used to draw images, both static and animated, on web pages and in other environments where file sizes need to be minimised.

Vector images also have the advantage that they can be more easily resized and stretched compared to bitmap graphics. Further, since the actual generation of the pixels to draw the image is left to the application and device to which the image is supplied, any changes in the scale and shape do not tend to affect the quality of the image since the image is effectively recalculated in situ.

For web based vector graphics, a popular format is that offered by Macromedia Inc.'s Flash environment. Flash is a vector graphic based animation technology which uses a downloadable plug-in to play Flash files (identified by a swf extension and typically referred to as SWF—"swiff"— files) through a user's browser.

The SWF file format is well documented and, for the present purposes, it is not necessary to set out the detail of this format here. A detailed explanation of the format can be obtained from Macromedia Inc., for example from their website at http://www.macromedia.com and is also found at http://www.openswf.org. A brief overview of the format is set out below by way of background to the present invention.

A SWF file stores information in binary format and is constructed as a sequence of data blocks referred to as "tags". Each SWF file starts with a header tag, is followed by a sequence of tags, which define the flash "movie", and finishes with an end tag to mark the end of the file for the player.

The header tag contains generic information for the whole file, including, for example, the file size in bytes, the size of the picture, and the frame rate of the SWF movie.

Each of the subsequent sequence of tags comprises a unique tag code, an indication of the total length of data in the tag, and the data itself. There are two principal types of tag: definition tags and control tags.

Definition tags store the content of a SWF movie. Vector graphics data defining shapes is stored as data blocks in the definition tags (apart from such vector data, definition tags can also store sounds and bit maps used in the movie). The geometry of shapes is defined as a sequence of curves and/or straight lines. The geometrical information can be supplemented by a variety of fill and line styles. Each definition tag or shape tag representing an individual shape is assigned a unique identifier known as a "character ID" to identify the shape represented by that definition tag for use by other tags.

The definition tags can also define higher order "symbols" using sprite tags by referring to the previously defined shapes or other symbols which may be organised in a hierarchical complex structure. The symbols themselves can be movie clips of their own consisting of several frames.

The second type of tag is a control tag. These tags are used to define, amongst other things, the flow of the movie, the placement of shapes (defined by the placement tags), and playing accompanying audio files. Whilst placing shapes, the control tag refers to the shape by means of its character ID. Placement tags optionally allow geometric and colour transformations to be applied to the original shape, thereby permitting a degree of flexibility and controlling the appearance of the original shape on the screen. Without placing a character using a placement tag the character will not be displayed. A geometric transformation accompanying a placement tag includes a scaling factor for effecting the transformation. The scaling factor is exploited to achieve compression in the present invention. A single shape definition may be re-used several times by various placement tags.

The vector shapes in SWF are defined by quadratic Bezier curves (requiring three points) and/or straight lines (requiring two end points). The point co-ordinates are defined in a device independent co-ordinate system which is not dependent on a pixelated bit map. The point co-ordinates are stored as integer co-ordinate values, in a unit of measurement called a TWIP. A TWIP is defined as one twentieth of a point which is a traditional measure in printing. In the context of an SWF file, a TWIP is considered to be one twentieth of a logical pixel. Thus, a rectangle 800 TWIPS wide by 400 TWIPS high would be rendered as 40×20 logical pixels. The number of bits occupied by a co-ordinate depends on its value. Large co-ordinate values require more bits compared to smaller co-ordinate values. The SWF format allocates just enough bits to precisely represent a given co-ordinate value.

In this way, the SWF file format provides a succinct representation of line shapes using a vector graphic approach. However, the nature of the software graphics world is such that there is always a desire to reduce file sizes further.

Accordingly, one aspect of the present invention provides a method of manipulating a vector graphics data file representative of at least one graphics element defined by a set of co-ordinate values in a graphics image, the method comprising the step of scaling down the at least one graphics element by applying a scaling factor to the set of co-ordinate values defining the at least one graphics element.

Preferably, each of the co-ordinate values is represented by a bit sequence and the step of applying the scaling factor comprises the step of eliminating at least the least significant bit from the co-ordinate values.

Conveniently, the scaling factor is $2^n$ where n is an integer value of one or more and comprises the number of bits to be removed from the bit sequence.

Advantageously, the step of applying the scaling factor comprises the step of dividing the co-ordinate values by the scaling factor, the scaling factor having a value greater than 1.

Preferably, each of the co-ordinate values is represented by a bit sequence and the scaling factor has a value which lies between $2^n$ and $2^{n+1}$, where n and n+1 are integer values representing the number of bits to be removed from the bit sequence.

Conveniently, the scaling factor is applied to all co-ordinate values used to define the at least one graphics element.

Advantageously, the data file is representative of a plurality of graphics elements, at least one of which has a respective scaling factor applied thereto.

Preferably, respective scaling factors are applied to respective ones of the graphics elements.

Conveniently, the further step of scaling up the at least one graphics element by applying an inverse of the scaling factor to the set of scaled co-ordinate values defining the at least one graphics element.

Advantageously, a predetermined scaling factor is applied to the co-ordinate values in the vector graphics data file.

Conveniently, the method comprises the step of applying a further scaling factor to the co-ordinate values in the vector graphics data file.

Preferably, the method comprises the further step of analysing the co-ordinate values in the vector graphics file and determining therefrom an appropriate scaling factor to be applied.

Advantageously, all the graphics elements are scaled up by an inverse of the scaling factor previously applied thereto.

Preferably, the data file comprises a series of frames, each frame showing at least one graphics element to which a scaling factor can be applied.

Conveniently, the step of applying a scaling factor to the set of co-ordinate values defining the at least one graphics element is carried out selectively on a frame by frame basis.

Advantageously, the scaling factor applied to a particular graphics element is selectable on a frame by frame basis.

Preferably, the scaling factor is applied to the at least one graphics element by setting a first scaling factor for the graphics element in one frame and setting a second scaling factor for the graphics element in another frame and applying a scaling factor between the first scaling factor and the second scaling factor to the graphics element for the frames between the one frame and the other frame.

Conveniently, the scaling factor is applied to the at least one graphics element in the intervening frames, as a linear function between the one frame and the other frame.

Advantageously, saving the vector graphics data file incorporating the scaled set of co-ordinate values and the respective scaling factors applied thereto.

Preferably, the step of reading the re-saved file and scaling up the at least one graphics element by applying an inverse of the scaling factor to the set of scaled co-ordinate values defining the at least one graphics element; and displaying the at least one graphics element.

Conveniently, the further steps of scaling up the at least one graphics element; displaying the graphics image including the graphics element; applying another scaling factor to the set of co-ordinate values defining the at least one graphics element; applying an inverse of the scaling factor to the set of co-ordinate values defining the at least one graphics element; and displaying the graphics image including the graphics element having the further scaling factor and inverse scaling factor applied thereto.

Advantageously, a further step of re-saving the data file is provided to incorporate the set of co-ordinate values scaled down by the further scaling factor.

Preferably, the method comprises the step of parsing a data file to extract vector graphics data representing individual graphics elements and then carrying out the scaling down step on one or more of the graphics elements.

Advantageously, the data file is a multimedia data file.

Preferably, the data file is a SWF file.

Conveniently, the method comprises the step of reconstituting the data file incorporating the scaled down co-ordinate values of the graphics elements.

Preferably, a constituent of the graphics element defined by the set of co-ordinate values has a line weight assigned thereto, which line weight is scaled down and assigned a compensating line weight such that when the graphics element is scaled up for display the line weight of the graphics element appears to a user to be substantially as the uncompressed original line weight assigned thereto.

Another aspect of the present invention provides a method of previewing a vector graphics image composed of a plurality of graphics elements comprising the steps of:

parsing a vector graphics data file into individual graphics elements;

selecting at least one graphics element;

selecting and applying a scaling factor to a set of co-ordinate values defining the at least one selected graphics element;

applying an inverse of the scaling factor to the set of co-ordinate values defining the at least one selected graphics element;

displaying the graphics image including the graphics element having the scaling factor and inverse scaling factor applied thereto; and providing an indication of data file compression as a result of said scaling such that the effect of the scaling on image quality and data file size can be appreciated.

Conveniently, the further step of varying the scaling factor applied to the set of co-ordinate values for the at least one graphics element during display of the graphics element.

Advantageously, the step of applying a scaling factor to the set of co-ordinate values defining the at least one selected graphics element is carried out selectively on a frame by frame basis.

Preferably, the scaling factor applied to a particular graphics element is selectable on a frame by frame basis.

Advantageously, said indication of data file compression to a user is graphical, numerical or audible.

Conveniently, the method of playing back a vector graphics data file manipulated in accordance with any preceding statement, comprises the steps of reading the vector graphics data file and extracting therefrom the scaled down set of co-ordinate values defining the at least one graphics element and the respective scaling factor applied to the set of co-ordinate values; applying an inverse of the respective scaling factors to the set of scaled co-ordinate values defining the at least one graphics element; and displaying the at least one graphics element.

Another aspect of the present invention provides a method of manipulating a vector graphics data file representative of at least one graphics element defined by a set of co-ordinate values in a graphics image, the method comprising the step of scaling down the at least one graphics element by eliminating at least a least significant bit from the co-ordinate values defining the at least one graphics element.

Preferably, an authoring tool comprising a computer program adapted to perform the steps of any of the above method statements, when the program is run on a computer.

BRIEF DESCRIPTION OF THE DRAWINGS

In order that the present invention may be more readily understood, embodiments thereof will now be described, by way of example, with reference to the accompanying drawings in which.

DETAILED DESCRIPTION OF PREFERRED EMBODIMENTS

An authoring tool embodying the present invention is an adaptation of existing authoring software products for, for example, Flash files or other vector graphics based animation technologies.

Many people regard the Flash format as being resolution independent. This is not, however, strictly the case. In fact, the Flash movie format (SWF format) has a resolution of some 20 points per pixel. Almost all flash files can therefore contain a significant amount of extraneous image data at this sub-pixel level which does not affect the appearance of an on-screen image. This over-specification in the Flash format is taken advantage of by the present invention to implement a form of data compression to minimise the size of SWF data files.

As discussed in the background section of the present Application, the SWF format operates in a defined co-ordinate system assigning co-ordinate values to the points which define a graphics element. In fact, each co-ordinate describing a vector shape is allocated only enough bits to store that co-ordinate so that large co-ordinate values take up many bits whereas smaller co-ordinate values take up less bits.

The degree of numerical precision provided by the co-ordinate values of the Flash file is, as mentioned above, over-specified and to a certain extent this information is redundant. The present invention takes advantage of this feature of the Flash files to optimise the appearance of the resultant image when a data file is compressed in accordance with the method embodying the present invention.

An embodiment of the present invention therefore provides an authoring tool which is operable to manipulate the data held in a vector graphics data file which is representative of a number of graphics elements which, together, make up a graphics image to be rendered on a display screen.

Each vector graphics data file, in this case a Flash file, comprises a header tag, a series of definition tags defining shapes, symbols or sounds, a series of control tags defining the placement of shapes and specifying frames in the movie defined by the file in which shapes are to be displayed, and the playback of sound. An end tag specifies the end of the file.

Figure 1:
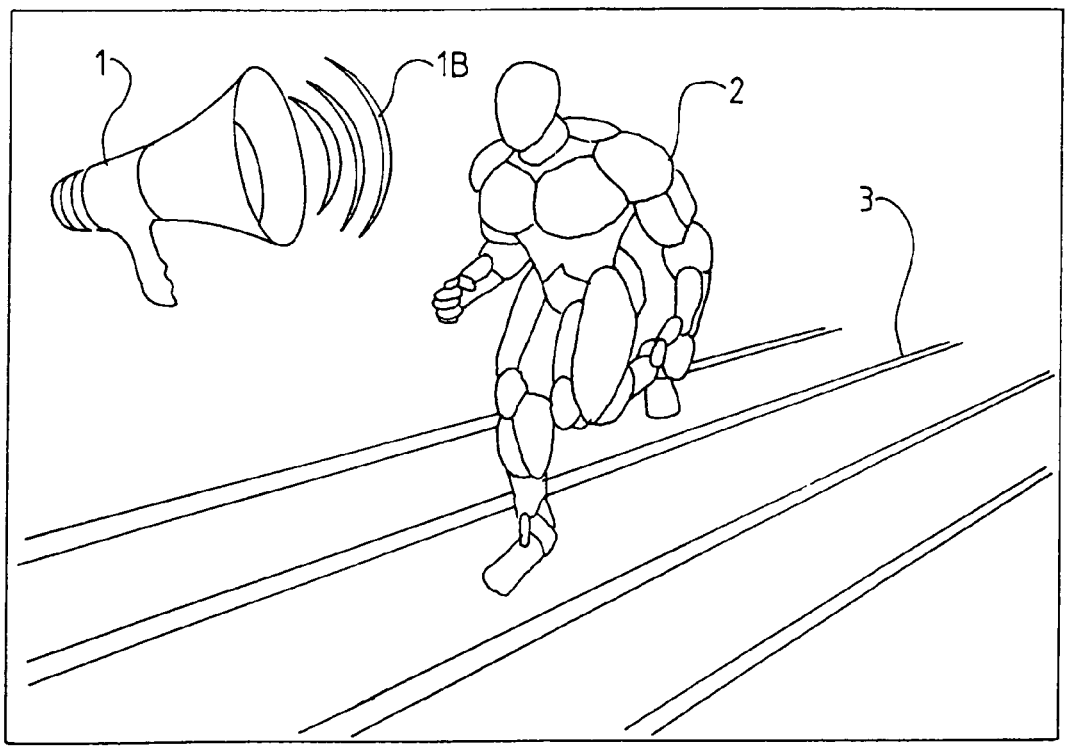
FIG. 1 is an exemplary vector graphic image comprising one frame of a Flash movie.

FIG. 1 shows an exemplary frame from a Flash movie made up of four graphics elements, three of which are symbols represented by definition tags (a loud-hailer 1, sound waves 1b and a running man 2). The fourth element, comprising the eight lines of a running track 3 is not defined as a symbol. The loud-hailer 1 remains stationary in the movie whilst the sound waves 1b pulse on and off. The lines of the running track 3 remain fixed on the screen and the running man 2 runs along the length of the running track and therefore comprises the only animated graphics element in the movie.

Figure 2:
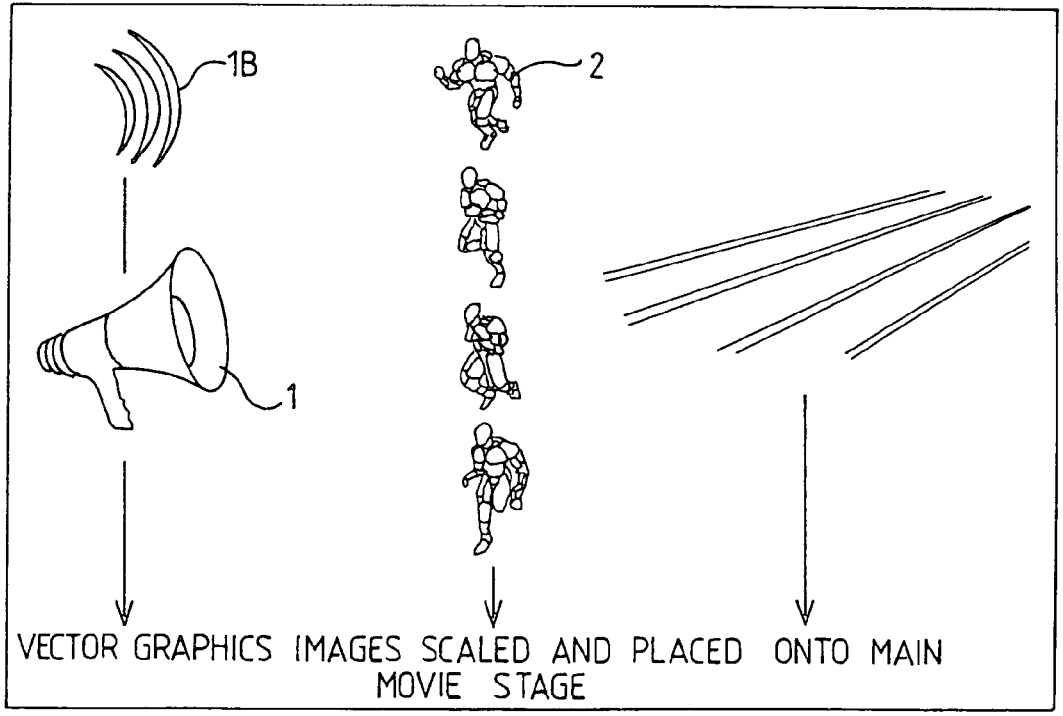
FIG. 2 is an image showing the individual symbols which make up the illustrated frame from the movie of FIG. 1.

The compression method embodying the present invention acts upon the definition tags which define the shapes of the graphics elements making up the resultant graphics image. The first stage is to parse the vector graphics data file into its respective components with a particular view to identifying the definition tags which define the shape of graphics elements (the so-called shape tags and higher order symbols, the so-called symbol tags). This step is readily accomplished by a number of methods but, most conveniently, can be effected by freely available SWF file parsing tools from www.openswf.org. The parsing of the vector graphics data file representing the movie shown in FIG. 1 is shown symbolically in FIG. 2.

Once the shape and symbol tags have been identified by parsing, the next stage is to compress the data represented in the definition tags by scaling down the co-ordinate values making up the set of co-ordinate values defining a graphics element.

The data file which is parsed may be a multimedia data file incorporating elements other than the vector graphics data such as sound and user interactivity. The parser is operable to identify and separate out the vector graphics elements.

Figure 3:
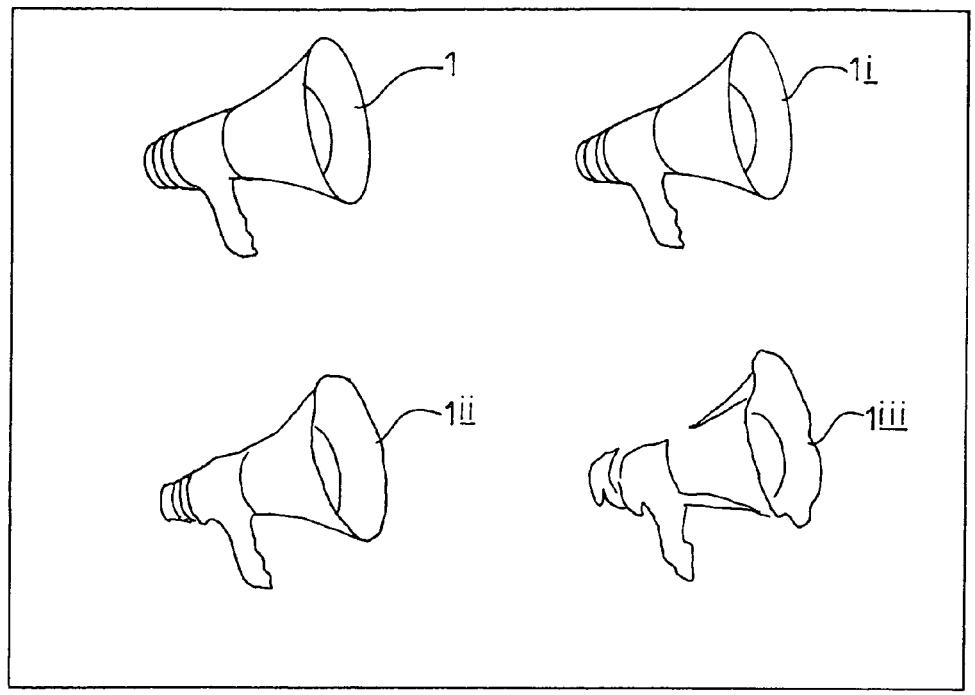
FIG. 3 illustrates four stages of compression embodying the present invention performed on one of the symbols from the frame of the movie shown in FIG. 1.

In a preferred embodiment, the authoring tool displays or lists the constituent vector graphic images on a screen or in a toolbar so as to provide for their selection. A user can select an individual symbol in isolation from the other symbols to allow manipulation of the data relating thereto. In particular, as shown in FIG. 3, the manipulation of the data takes the form of scaling down a graphics element by applying a scaling factor to the set of co-ordinate values defining that graphics element. In the example shown in FIG. 3, the loud-hailer symbol 1 is selected for compression. The original symbol is referred to in the Figure by reference numeral 1. The original symbol takes up 0.41 kilobytes of file space. The symbol 1 is subjected to scalar compression by scaling down the set of co-ordinate values defining the symbol 1, which scalar compression results in a 34% reduction of file size down to 0.27 kB. The resultant symbol 1i is shown in FIG. 3. It is apparent that there is very little degradation in image quality. For the purposes of illustration, symbols 1ii and 1iii represent further scalar compression of the original symbol resulting in, respectively, 43% reduction in the file size to 0.23 kB (1ii) and 52% reduction in file size to 0.20 kB (1iii). It is clear that the image quality in the most compressed data file has suffered.

Importantly, this file size reduction is indicated to the user, preferably by an on-screen numerical display. It should be appreciated that many other modes of providing this valuable feedback to the user can be employed, such as a graphic or audible indicator.

Once the various symbols have been selected and scaled down to a desired level, the resultant data file is re-saved as a Flash file incorporating the scaled down co-ordinate values together with the scaling factor applied to the respective symbols. This reconstitution of the data file maintains any other non-vector graphics data (if the data file is a multimedia file for example) and simply reinserts the scaled down co-ordinate value data. The reconstituted file benefits from significant file size reduction as a result of the scaling down of the co-ordinate values.

The Flash movie player reads such re-saved SWF files and scales up the graphics element by applying the inverses of the respective scaling factors to the respective sets of co-ordinate values defined in the graphics elements which can then be displayed. This is a conventional feature of the Flash movie player which conventionally requires a scaling factor to display a symbol or a shape.

It is preferred that the scaling down step is effected by bit elimination. Each of the co-ordinate values is represented as a bit sequence. Removal of the least significant bit from that bit sequence scales down the co-ordinate values by a factor of 2. If the two least significant bits are eliminated, then the scaling down factor would be $2^2$ i.e. 4. Thus, the scaling factor can be selected as $2^n$, where n is an integer of 1 or more. It should be noted that the bit elimination technique is particularly well suited and can be readily implemented to vector graphics data compression techniques.

Another method of scaling down is to divide the co-ordinate values by the scaling factor which can take any value greater than 1.

Additionally, a final scaling factor can be achieved by a combination of bit-elimination and scaling down by a divisor scaling factor. The final scaling factor can eliminate a varying number of bits (n or n+1) bits depending on the co-ordinate values. For example, a scaling factor of 3 applied to a co-ordinate value of 4 eliminates two bits. A co-ordinate value of 6 having the same scaling factor of 3 applied thereto results in a value of 2 which means that the co-ordinate value loses one bit. This is because the scaling factor lies between $2^1$ and $2^2$. Such a combined scaling factor offers a more intelligent method of achieving superior visual quality than can be obtained using simple bit elimination.

Scaling up of the co-ordinate values is effected by applying the inverse of the scaling factor to the co-ordinate values so that the co-ordinate values are restored to their original state although it should be noted that when scaling up following scaling down by bit elimination, data is irretrievably lost although, as previously mentioned, it is anticipated that most of the data which is lost will be at the sub-pixel level and therefore substantially unnoticeable when the image is displayed (for low order scaling factors).

It has been noted that the scaling up process can incorrectly scale up the weights applied to lines. For example, a Flash Player automatically enlarges a file for display and thus scales up the entire image including the line weights. There is no decimalisation of line weights in Flash so a line weight of 1 pt scaled down by a scaling factor of 10 does not result in a line weight of 0.1 pt but of 0 pt. When this image is reproduced by the Flash Player, a line weight of 1 pt is automatically attributed to the 0 pt value line weight. When the Flash Player scales up the image for display by the scaling factor of 10, the reproduced line is incorrectly displayed with a line weight of 10 pt.

To correct this misattribution of line weights, a preferred example of the present invention assigns a compensating scaled down line weight to the graphics element in the Flash file, in this example, an apparent line weight of 0.1 pt would be attributed to the line weight in the graphics file being compressed. Thus, when the file is scaled up by a factor of 10, the line weight is reverted as close as possible to its true line weight of 1 pt. This step of recalculating an apparent line weight and attributing the same to a respective line weight in the vector graphics data file being compressed therefore compensates for any distorted line weights which would otherwise be created. In some circumstances, the resultant scaled up line weight may not be identical to the original line weight since there may be a limited number of discrete line weights which can be saved in the vector graphics data file or assigned to a graphics element, in which case the line weight is selected to be the closest assignable line weight to the original line weight—i.e. substantially the original line weight—so that when the image in the compressed data file is scaled up during the display process it appears to a user to have substantially the same line weight as the uncompressed original line weight.

The above described method of manipulating vector graphics data files is fairly unsophisticated in its most simple implementation. However, as will be described below, the above mentioned technique allows significant tailoring or tuning of data files in the Flash authoring environment which has previously been impossible.

In many examples of Flash movies, there are graphics elements of prime interest or importance and those of lesser importance. Those graphics elements of lesser importance can have significant scaling factors applied thereto thereby minimising the amount of data file space which they occupy. Although the resultant image quality for some of these symbols may be degraded, this is not a prime concern as the other characters of greater importance can be rendered either without any scaling or only with minimal scaling which has little or no effect on image quality.

The authoring tool embodying the present invention allows rapid previewing (if not real time) of the effects of scaling factors on respective graphics elements along with file size feedback relative to image degradation. This is an extremely powerful tool allowing a designer to see in real time the effect that scaling has on the appearance of a graphics element and allowing the designer to minimise the size of the data file occupied by the graphics element whilst maintaining an acceptable level of image quality for that graphics element.

Figure 5:
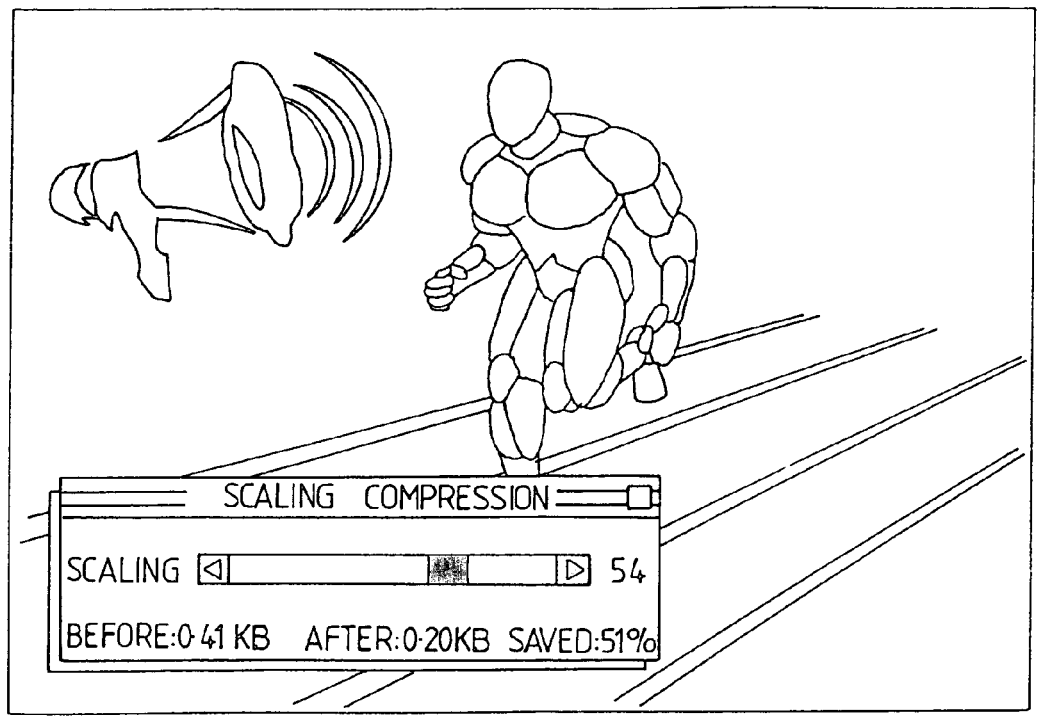
FIG. 5 is a frame of the movie of FIG. 1 illustrating two of the symbols, one of which is subjected to scaling compression embodying the present invention and also showing a scaling compression tool bar embodying the present invention.

Thus, referring to FIG. 5, the authoring tool displays a scaling compression toolbar allowing adjustment of the scaling factor using a conventional scroll bar. The symbol being compressed is the combination of symbols 1 and 1*b*—the loud-hailer and the sound waves. The other graphics elements of the movie are also shown in the Figure but are not manipulated by scalar compression although, for example, the animated movie comprising the running man 2 is seen running across the screen whilst the scalar compression toolbar is active and implementing changes to the scaling factor applied to the symbols 1, 1*b*.

Moving the scroll bar to the left allows the user to minimise the scaling factor thereby providing maximum image quality. Moving the scroll bar to the right allows the user to minimise file size by increasing the scaling factor although sacrificing image quality as can be seen in FIG. 5. The designer is able, in real time, and importantly in the context of the rest of the movie, to apply a scaling factor which minimises file size to an appropriate level whilst preserving an acceptable level of image quality for that particular graphics element. Exactly the same process can be performed by selecting another of the symbols, for example, the running man 2, and applying scalar compression thereto using the scalar compression toolbar whilst leaving the remainder of the graphics elements in the movie unaffected although still showing the running man 2 in various stages of scalar compression and in the context of the rest of the movie.

Normally, it would be appropriate to apply a single scaling factor to a particular graphics element throughout the duration of a movie. However, in some circumstances, it is advantageous to be able to apply a variable scaling factor to an individual graphics element, the scaling factor varying from frame to frame within the movie. A particularly good example would be a movie incorporating as a graphics element a rotating human head. Clearly, the important facial features are on the front of the head—the face, whereas the sides and rear of the head are substantially devoid of important features. Accordingly, for those frames in the movie in which the face is visible, a low scaling factor can be applied so that maximum image quality is maintained. However, for those frames in the movie in which the face is only partially visible and the rear of the head is more prominent, the scaling factor can be greatly increased as it is unimportant to maintain image quality solely to display the back of the head. Thus, not only does the authoring tool of the present invention allow compression of data files with reference to image quality of individual graphics elements but it also allows the application of such scaling factors on a frame by frame basis throughout the movie.

Figure 6:
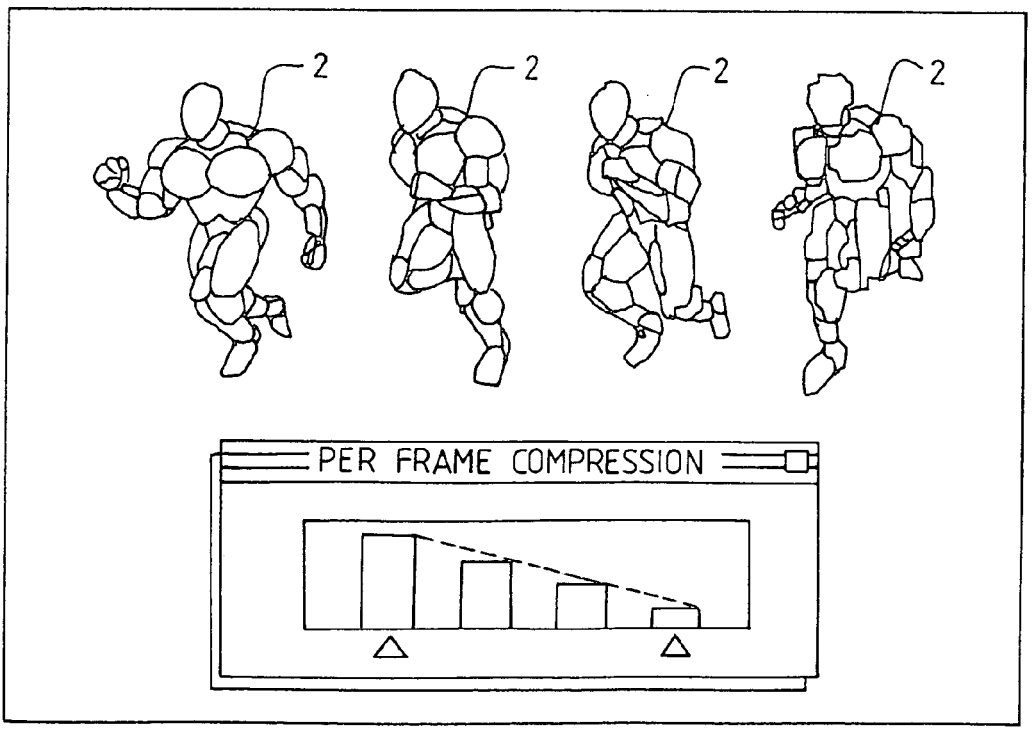
FIG. 6 illustrates a symbol taken from four separate frames from the movie of FIG. 1, the symbol being shown in an increasingly compressed state, and a per frame compression toolbar embodying the present invention.

An example of such per frame compression is shown in FIG. 6 in which the running man symbol 2 is shown at four different levels of compression in four respective frames of the movie. Conveniently, the user of the authoring tool only needs to select the original scaling factor for the first frame and the final scaling factor for the last frame, the software interpolating the scaling factor between the levels indicated for the start and end frames so that the scaling factor is applied to the symbol 2 in the intervening frames as a linear function as shown in the per frame compression toolbar of FIG. 6.

Figure 4:
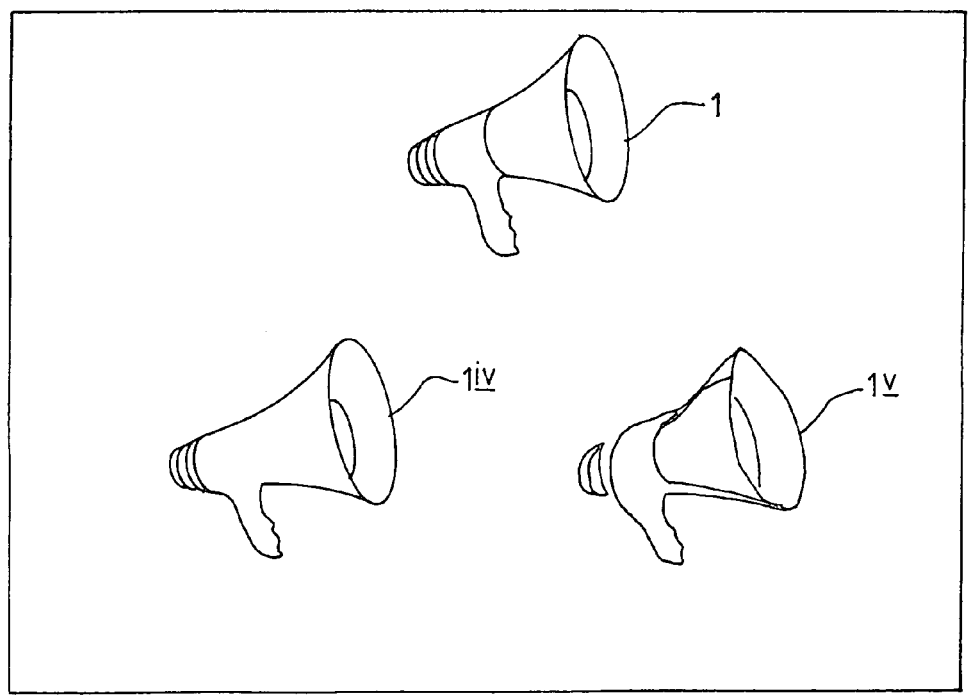
FIG. 4 is a comparison showing image degradation from an original symbol from the movie frame of FIG. 1; the original symbol compressed using a method embodying the present invention; and the original image compressed using a curve optimisation function available in the Flash authoring tool.

As a further means of compression, it is also possible to take advantage of curve compression or curve optimisation. This is a conventional technique which involves a sequence of curves being merged to form a single curve thereby reducing data size. In some circumstances, curves can be converted to straight lines taking up less data space. FIG. 4 shows an interesting comparison between the relative image qualities which can be obtained by using the scalar compression embodying the present invention and a curve optimisation technique. In FIG. 4, the original symbol 1 is shown having a file size of 0.41 kB. When subjected to scalar compression embodying the present invention, the file size is reduced by 34% to 0.27 kB with minimal reduction in image quality (1*iv*). In contrast, compression using curve optimisation of the symbol 1 with the same reduction in file size results in a symbol with noticeable image degradation and loss of features (1*v*). Accordingly, it will be appreciated that scalar compression embodying the present invention offers a better alternative to curve optimisation techniques with less degradation in image quality.

The above described examples preferably involve manual intervention by an author using the authoring tool to determine from the displayed graphics what level of compression is acceptable. Another example of the present invention uses the same concept for compressing the vector graphics files but does so without intervention from the author. In this alternative method of the invention, compression of a vector graphics file is accomplished by defining a tolerance level which is acceptable to the author and the file is then automatically compressed by scaling the co-ordinate values using a scaling factor determined by the selected tolerance. For example, there might be five tolerance levels: None, Low, Medium, High and Maximum each having their own associated scaling factor.

It is also envisaged that the optimum level of compression can be determined automatically using an iterative process which applies a low scaling factor a number of times until the level of distortion approaches a set threshold beyond which the level of distortion is unacceptable or until an author reviewing a display of the compressed vector graphics file determines that the level of distortion is approaching the unacceptable. Algorithms can be readily provided to set the distortion thresholds and detect when a distortion threshold is being approached so as to halt the compression at a level which offers the optimum compression without unduly distorting the resultant image. Such algorithms or processes would analyse the co-ordinate values present in the vector graphics data file and determine therefrom whether there is compressible data present and, if so, determine an optimum scaling factor.

In the crudest embodiment of the invention, the scaling factor is set to a sensible default value preferably determined heuristically and all appropriate co-ordinate values in a vector graphics data file are scaled thereby without recourse to the level of distortion that is to be incurred.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of manipulating a vector graphics data file representative of at least one graphics element defined by a set of co-ordinate values in a graphics image, the method comprising the steps of scaling down the at least one graphics element by applying a scaling factor to the set of co-ordinate values defining the at least one graphics element, wherein each of the co-ordinate values is represented by a bit sequence and the step of applying the scaling factor comprises the step of removing at least the least significant bit from the bit sequences representing the co-ordinate values, and wherein the scaling factor comprises a combined scaling factor having a value which lies between $2^n$ and $2^{n+1}$, where n and n+1 are integer values representing the number of bits to be removed from the bit sequence, the number of bits being dependent on the co-ordinate value being scaled; and displaying the at least one graphics element.

2. A method according to claim 1, wherein the scaling factor is $2^n$ where n is an integer value of one or more and comprises the number of bits to be removed from the bit sequence.

3. A method according to claim 1, wherein the step of applying the scaling factor comprises the step of dividing the co-ordinate values by the scaling factor, the scaling factor having a value greater than 1.

4. A method according to claim 1, wherein the scaling factor is applied to all co-ordinate values used to define the at least one graphics element.

5. A method according to claim 1, wherein the vector graphics data file is representative of a plurality of graphics elements, at least one of which has a respective scaling factor applied thereto.

6. A method according to claim 5, wherein respective scaling factors are applied to respective ones of the graphics elements.

7. A method according to claim 1, comprising the further step of scaling up the at least one graphics element by applying an inverse of the scaling factor to the set of scaled co-ordinate values defining the at least one graphics element.

8. A method according to claim 7, wherein all the graphics elements are scaled up by an inverse of the scaling factor previously applied thereto.

9. A method according to claim 1, wherein a predetermined scaling factor is applied to the co-ordinate values in the vector graphics data file.

10. A method according to claim 9, comprising the step of applying a further scaling factor to the co-ordinate values in the vector graphics data file.

11. A method according to claim 1, comprising the further step of analysing the co-ordinate values in the vector graphics file and determining therefrom an appropriate scaling factor to be applied.

12. A method according to claim 1, wherein the vector graphics data file comprises a series of frames, each frame showing at least one graphics element to which a scaling factor can be applied.

13. A method according to claim 12, wherein the step of applying a scaling factor to the set of co-ordinate values defining the at least one graphics element is carried out selectively on a frame by frame basis.

14. A method according to claim 12, wherein the scaling factor applied to a particular graphics element is selectable on a frame by frame basis.

15. A method according to claim 14, wherein the scaling factor is applied to the at least one graphics element by setting a first scaling factor for the graphics element in one frame and setting a second scaling factor for the graphics element in another frame and applying a scaling factor between the first scaling factor and the second scaling factor to the graphics element for the frames between the one frame and the other frame.

16. A method according to claim 15, wherein the scaling factor is applied to the at least one graphics element in the intervening frames, as a linear function between the one frame and the other frame.

17. A method according to claim 1, comprising saving the vector graphics data file incorporating the scaled set of co-ordinate values and the respective scaling factors applied thereto.

18. A method according to claim 17, comprising the step of reading the re-saved file and scaling up the at least one graphics element by applying an inverse of the scaling factor to the set of scaled co-ordinate values defining the at least one graphics element; and displaying the at least one graphics element.

19. A method according to claim 1, comprising the further steps of scaling up the at least one graphics element; displaying the graphics image including the graphics element; applying another scaling factor to the set of co-ordinate values defining the at least one graphics element; applying an inverse of the scaling factor to the set of co-ordinate values defining the at least one graphics element; and displaying the graphics image including the graphics element having the further scaling factor and inverse scaling factor applied thereto.

20. A method according to claim 19, comprising the further step of re-saving the data file incorporating the set of co-ordinate values scaled down by the further scaling factor.

21. A method according to claim 1, comprising the step of parsing a data file to extract vector graphics data representing individual graphics elements and then carrying out the scaling down step on one or more of the graphics elements.

22. A method according to claim 21, wherein the data file is a multimedia data file.

23. A method according to claim 21, wherein the data file is a SWF file.

24. A method according to claim 21, comprising the step of reconstituting the data file incorporating the scaled down co-ordinate values of the graphics elements.

25. A method according to claim 1 further comprising the steps of reading the vector graphics data file and extracting therefrom the scaled down set of co-ordinate values defining the at least one graphics element and the respective scaling factor applied to the set of co-ordinate values; applying an inverse of the respective scaling factors to the set of scaled co-ordinate values defining the at least one graphics element; and displaying the at least one graphics element.

26. A method of manipulating a vector graphics data file representative of at least one graphics element defined by a set of co-ordinate values in a graphics image, the method comprising the steps of compressing the at least one graphics element by applying a scaling factor to the set of co-ordinate values defining the at least one graphics element, wherein a constituent of the graphics element defined by the set of co-ordinate values has a line weight assigned thereto, which line weight is compressed and assigned a compensating line weight such that when the graphics element is scaled up for display the line weight of the graphics element appears to a user to be substantially as the uncompressed original line weight assigned thereto; and displaying the at least one graphics element.

27. A method according to claim 26, wherein each of the co-ordinate values is represented by a bit sequence and the step of applying the scaling factor comprises the step of eliminating at least the least significant bit from the co-ordinate values.

28. A method according to claim 26, wherein the scaling factor is $2^n$ where n is an integer value of one or more and comprises the number of bits to be removed from the bit sequence.

29. A method according to claim 26, wherein the step of applying the scaling factor comprises the step of dividing the co-ordinate values by the scaling factor, the scaling factor having a value greater than 1.

30. A method according to claim 26, wherein each of the co-ordinate ordinate values is represented by a bit sequence and the scaling factor comprises a combined scaling factor having a value which lies between $2^n$ and $2^{n+1}$, where n and n+1 are integer values representing the number of bits to be removed from the bit sequence, the number of bits being dependent on the co-ordinate value being scaled.

31. A method according to claim 26, wherein the scaling factor is applied to all co-ordinate values used to define the at least one graphics element.

32. A method according to claim 26, wherein the vector graphics data file is representative of a plurality of graphics elements, at least one of which has a respective scaling factor applied thereto.

33. A method according to claim 26, comprising the further step of scaling up the at least one graphics element by applying an inverse of the scaling factor to the set of scaled co-ordinate values defining the at least one graphics element.

34. A method according to claim 26, wherein a predetermined scaling factor is applied to the co-ordinate values in the vector graphics data file.

35. A method according to claim 26, comprising the further step of analysing the co-ordinate values in the vector graphics file and determining therefrom an appropriate scaling factor to be applied.

36. A method according to claim 26, wherein the vector graphics data file comprises a series of frames, each frame showing at least one graphics element to which a scaling factor can be applied.

37. A method according to claim 26, comprising saving the vector graphics data file incorporating the scaled set of co-ordinate values and the respective scaling factors applied thereto.

38. A method according to claim 26, comprising the further steps of scaling up the at least one graphics element; displaying the graphics image including the graphics element; applying another scaling factor to the set of co-ordinate values defining the at least one graphics element; applying an inverse of the scaling factor to the set of co-ordinate values defining the at least one graphics element; and displaying the graphics image including the graphics element having the further scaling factor and inverse scaling factor applied thereto.

39. A method according to claim 26, comprising the further step of re-saving the data file incorporating the set of co-ordinate values scaled down by the further scaling factor.

40. A method of previewing a vector graphics image composed of a plurality of graphics elements comprising the steps of:
- parsing a vector graphics data file into individual graphics elements;
- selecting at least one graphics element;
- selecting and applying a scaling factor to a set of co-ordinate values represented by a bit sequence defining the at least one selected graphics element, wherein the step of applying the scaling factor comprises the step of eliminating at least the least significant bit from the co-ordinate values;
- applying an inverse of the scaling factor to the set of co-ordinate values defining the at least one selected graphics element;
- displaying the graphics image including the graphics element having the scaling factor and inverse scaling factor applied thereto; and
- providing an indication of data file compression as a result of said scaling such that the effect of the scaling on image quality and data file size can be appreciated.

41. A method according to claim 40, comprising the further step of varying the scaling factor applied to the set of co-ordinate values for the at least one graphics element during display of the graphics element.

42. A method according to claim 40, wherein the step of applying a scaling factor to the set of co-ordinate values defining the at least one selected graphics element is carried out selectively on a frame by frame basis.

43. A method according to claim 40, wherein the scaling factor applied to a particular graphics element is selectable on a frame by frame basis.

44. A method according to claim 40, wherein said indication of data file compression to a user is graphical, numerical or audible.

45. A computer-readable medium encoded with computer-executable instructions for performing steps of manipulating a vector graphics data file representative of at least one graphics element defined by a set of co-ordinate values in a graphics image, the method comprising scaling down the at least one graphics element by applying a scaling factor to the set of co-ordinate values defining the at least one graphics element, wherein each of the co-ordinate values is represented by a bit sequence and the step of applying the scaling factor comprises the step of removing at least the least significant bit from the bit sequences representing the co-ordinate values, and the scaling factor comprises a combined scaling factor having a value which lies between $2^n$ and $2^{n+1}$, where n and n+1 are integer values representing the number of bits to be removed from the bit sequence, the number of bits being dependent on the co-ordinate value being scaled.

46. A method of previewing a vector graphics image composed of a plurality of graphics elements comprising the steps of:
- parsing a vector graphics data file into individual graphics elements;
- selecting at least one graphics element;
- selecting and applying a scaling factor to a set of co-ordinate values defining the at least one selected graphics element wherein a constituent of the graphics element defined by the set of co-ordinate values has a line weight assigned thereto, which line weight is scaled down and assigned a compensating line weight such that when the graphics element is scaled up for display the line weight of the graphics element appears to a user as the original line weight assigned thereto despite compression of the line weight assigned to the co-ordinate values;
- applying an inverse of the scaling factor to the set of co-ordinate values defining the at least one selected graphics element;
- displaying the graphics image including the graphics element having the scaling factor and inverse scaling factor applied thereto; and
- providing an indication of data file compression as a result of said scaling such that the effect of the scaling on image quality and data file size can be appreciated.

47. A method according to claim 46, comprising the further step of varying the scaling factor applied to the set of co-ordinate values for the at least one graphics element during display of the graphics element.

* * * * *